Nov. 22, 1927.  W. A. GUYER  1,650,444
CREAM SEPARATOR
Filed Aug. 26, 1926   2 Sheets-Sheet 2
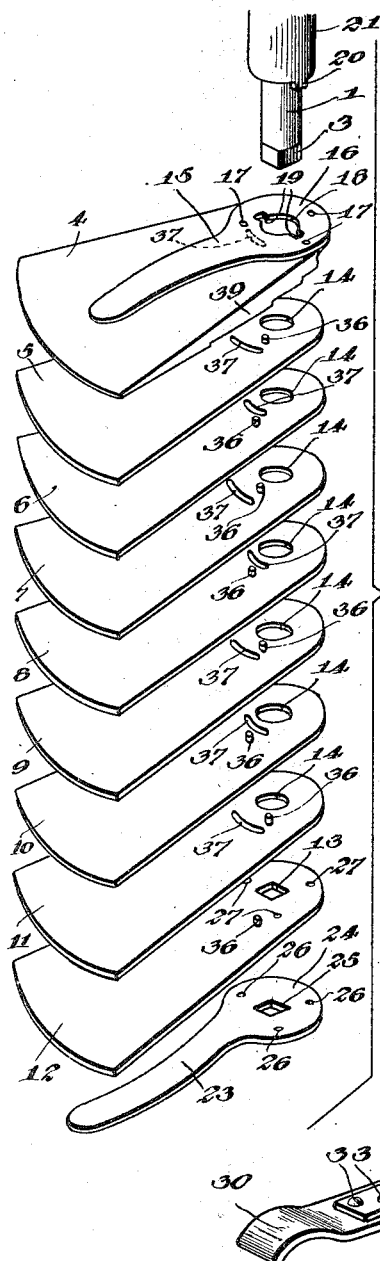
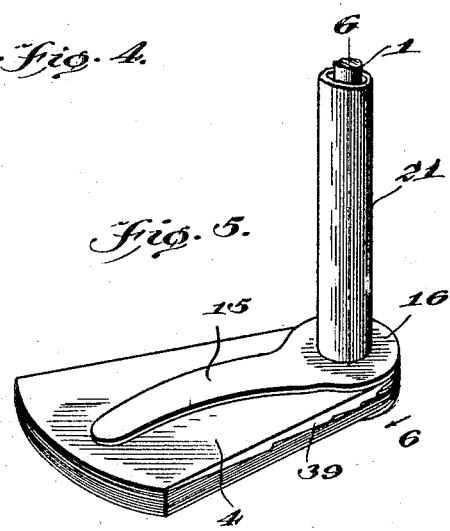
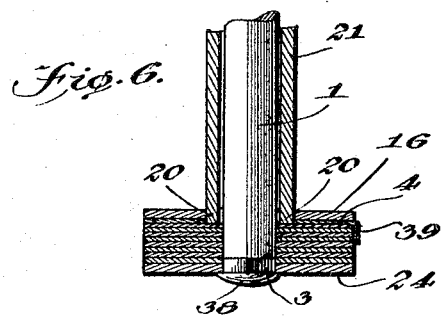
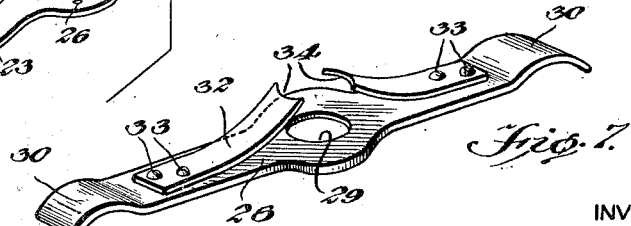
INVENTOR
*Walter A. Guyer,*
BY
ATTORNEYS Patented Nov. 22, 1927.

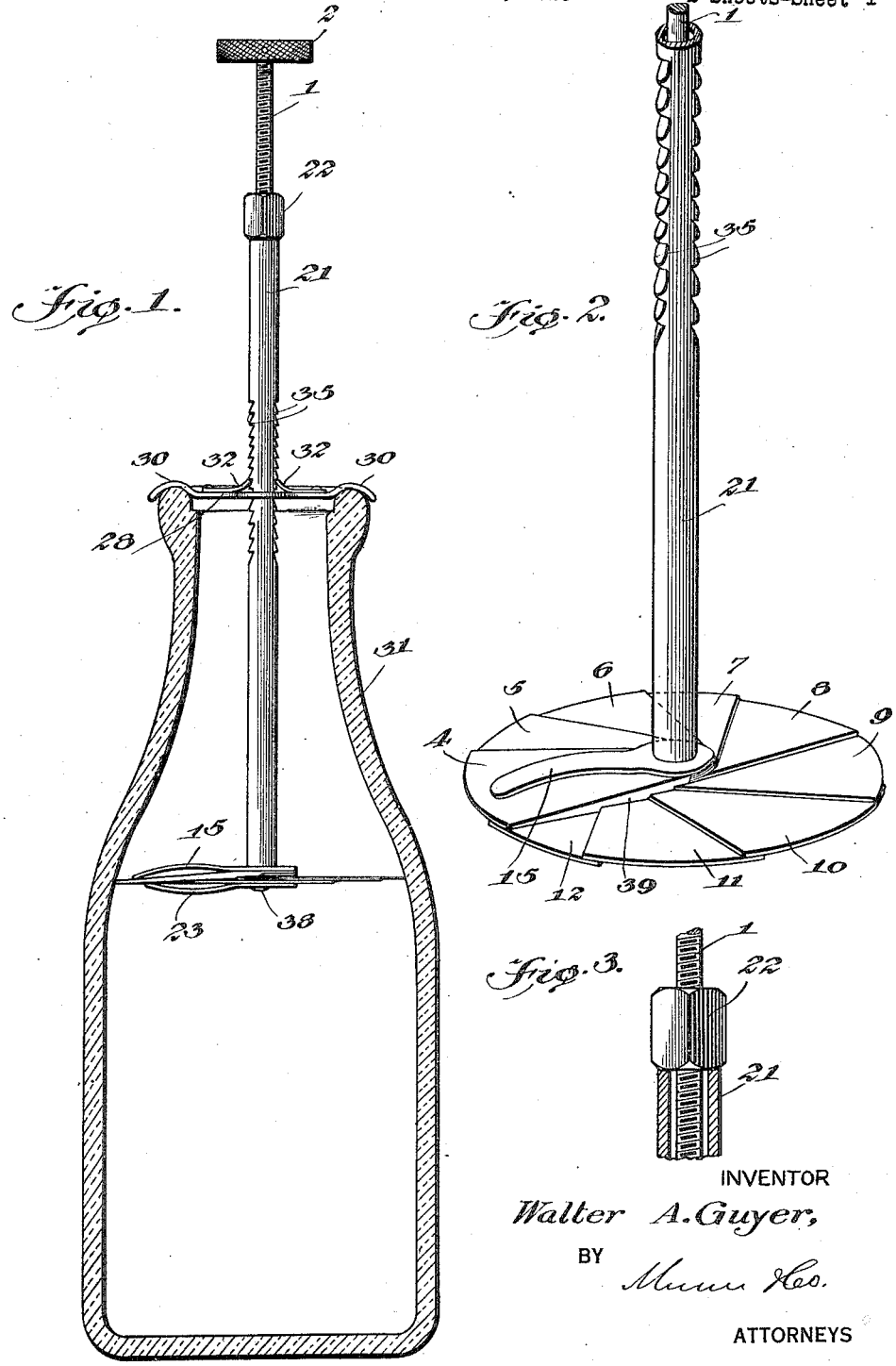

1,650,444

UNITED STATES PATENT OFFICE.

WALTER A. GUYER, OF CHARLESTON, WASHINGTON.

CREAM SEPARATOR.

Application filed August 26, 1926. Serial No. 131,676.

My invention relates to improvements in devices for separating the cream from milk in a bottle or like vessel, and it consists in the combinations, constructions and arrangements herein described and claimed.

An object of the invention is the provision of a device which includes an expansible and contractile separator head which can be projected through the relatively narrow mouth of a milk bottle or like vessel into the body of the vessel when in contracted position and then expanded to produce a dividing wall between the milk and the cream in the bottle or between liquids of different densities in any suitable vessel and the cream or other liquid in the top of the bottle then can be poured from the bottle without spilling of the remaining liquid contents of the bottle or other vessel.

A further object of the invention is the provision of a separating device of the character described which can be disposed when contracted within a milk bottle or like vessel and then expanded to separate the liquid in the upper part of the bottle from the liquid in the lower part of the bottle without causing any appreciable agitation of the liquid contents of the vessel.

A still further object of the invention is the provision of a cream separator which will be reliable in use, convenient and easy to operate, and thoroughly practical commercially.

Other objects and advantages of the invention will be apparent from the following description, considered in conjunction with the accompanying drawings, in which Figure 1 is a vertical section through a bottle of milk, showing in side elevation a cream separator embodying the invention in position to separate the cream from the milk in the bottle, Figure 2 is a fragmentary perspective view of the separator head and associated parts, the separator head being shown in expanded position, Figure 3 is a detail view of a portion of the operating rod or shaft of the device together with a fragmentary portion of a spacer sleeve on the rod and an adjustable stop nut that is in threaded engagement with the rod, Figure 4 is a perspective group view of the elements of the expansible and contractile separator head and associated elements of the device in separated positions, Figure 5 is a perspective view of the separator head and associated elements of the device, the separator head being shown in contracted position, Figure 6 is a section substantially along the line 6—6 of Figure 5, and Figure 7 is a perspective view of an adjustable holding member that is used in the device.

The improved separator device includes an operating rod or shaft 1. The peripherally knurled hand wheel 2 is secured to the upper end portion of the shaft 1 and the lower end portion of the shaft 1 is squared as indicated at 3 in Figures 4 and 6. The separator head of the device comprises a vertical series of substantially sector-shaped plates or vanes which respectively are designated 4 to 12 inclusive, and which are best seen in Figure 4. Each of said vanes is provided with a transverse opening through its inner end portion along its longitudinal median line as indicated at 13 for the vane 12 and at 14 for each of the remaining vanes, the only difference between the opening 13 and each of the openings 14 being that the opening 13 is square in cross section and adapted to fit snugly on the squared portion 3 of the shaft 1 while each of the openings 14 is circular and is adapted to receive rotatably a circular portion of the shaft 1. The inner end edges of the vanes are rounded off to be concentric with the aforesaid openings of said vanes and the outer end edges of the vanes also are curved convexly along arcs of circles concentric with said openings. in the inner end portions of said vanes. The separator head also comprises a substantially flat upper coupling member 15 which is superimposed on the vane 4 and has a hub portion 16 secured by rivets 17 or like fastening devices on the inner end portion of the vane 4 so that a central opening 18 in the hub portion 16 will be aligned with the aforesaid opening in the inner end portion of the vane 4. The opening 18 also is adapted to have the shaft 1 projected therethrough and is provided with diametrically opposite notches 19 in its wall for the reception of diametrically opposite end extensions 20 at the lower end of a spacing sleeve 21 which is disposed rather loosely on the shaft 1 between the hub 16 of the coupling member 15 and a nut 22 that is in threaded engagement with the upper end portion of the shaft 1.

The separator head also includes a lower substantially flat coupling member 23 which is disposed flatwise against the lower face of the vane 12 and has a hub portion 24 formed with a square central opening 25 similar to the opening 13. The hub 24 of the lower coupling member 23 also is formed with other openings as indicated at 26 adapted to register with openings 27 in the inner end portion of the vane 12 so that rivets may be secured in aligned openings 26—27 to secure the coupling member 23 to the vane 12.

A holding device that is included in the improved cream separator comprises a substantially flat strip 28 of metal or other suitable material having a transverse opening 29 formed therethrough intermediate its length for loosely receiving the sleeve 21. The end portions 30 of the strip 28 are curved similarly to be slightly convexo-concave so as to fit snugly across the convexly curved opposite portions of the rim edge or mouth of a conventional milk bottle 31 as shown in Figure 1. The strip 28 carries a pair of spring latching arms 32 having their outer end portions secured by fastening devices 33 on the strip 28 at opposite sides of the opening 29 so that the inner end edges of the spring arms 32 will be in sliding contact with opposite sides of the sleeve 21 when the strip 28 is disposed slidably on the sleeve 21 as shown in Figure 1. The inner end edges of the spring members 32 are curved concavely at 34 to conform to the transverse curvature of the outer wall of the sleeve 21.

The aforesaid opposite side portions of the sleeve 21 are provided for part of their length with series of vertically spaced teeth 35 with which the inner end portions of the spring members 32 are adapted to mesh, each of the teeth 35 having a sloping upper wall and a nearly horizontal lower wall so that the strips 28 can be slid downwardly on the sleeve 21 while the inner end portions of the spring members 32 are in engagement with the teeth 35 but will be held against upward movement on the sleeve 21 until the inner end portions of the springs 32 have been disengaged from the associated teeth.

From the foregoing description of the various parts of the device, the operation thereof may be readily understood. After the sleeve 21 has been placed on the shaft 1 against the nut 22, the vanes 4 to 12 inclusive are placed on the lower end portion of the shaft 1 in the order named so that an upstanding stud projection 36 on each of the vanes 5 to 12 inclusive will extend into an arcuate slot 37 in the next higher vane, it being understood that the coupling member 15 has been secured to the vane 4 and the coupling member 23 has been secured to the vane 12 before the vanes are disposed on the lower end portion of the shaft 1 in the manner just mentioned.

The squared lower end portion 3 of the shaft 1 will fit in the square openings 13—25 of the lower vane 12 and the coupling member 23 and the extreme lower end portion of the shaft 1 then is upset as indicated at 38 to retain the vanes against displacement in a downward direction from the lower end portion of the shaft 1. The arcuate slots 37 extend along arcs of circles concentric with the openings 14 in the vanes in which said slots are formed. The projections 20 and the lower end of the sleeve 21 will be received in the opposite notches 19 in the wall of the opening 18 of the hub of the coupling member 15 and the nut 22 then is adjusted on the upper end portion of the shaft 1 to prevent such upward movement of the sleeve 21 on the shaft 1 as would move the projections 20 out of the notches 19. It thus will be apparent that the bottom vane 12 will be connected with the shaft 1 rigidly so as to rotate with the shaft 1 and that the top vane, 4, will be similarly connected with the sleeve 21. The sleeve 21 and the axle 1 are capable of relative rotary movements and since adjacent vanes are capable of only limited swinging movements independently of each other about the axis of the shaft 1, it is obvious that the vanes will be actuated sequentially on relative rotary movements of the shaft 1 and the sleeve 21 to swing from positions in which the respective vanes are disposed as shown in Figure 5 to positions in which the outer end portions of the vanes are disposed in a circle about the axis of the shaft 1 with only the side edge portions of adjacent vanes lapped as shown in Figure 2, or vice versa. The top vane 4 is provided at one side edge with a depending sealing flange or lip 39 having its lower edge stepped as best seen in Figure 2 to contact closely with the upper surfaces of the adjacent vanes along a line extending from the outer edge of the vane 4 to the hub of the coupling member 15 when the vanes are in expanded positions, as shown in Figure 2. The lip 39 thus serves as a stop for limiting the relative swinging movements of the vanes from closed positions as shown in Figure 5 and also by engaging with side edge portions of certain of the vanes as shown in Figure 6 tends to limit the relative swinging movements of the vanes from expanded positions as shown in Figure 2 to closed positions as shown in Figure 5.

In using the device, the separator head is lowered into a milk bottle 31 or like vessel while the separator head is in its contracted position. The separator head is of sufficient diameter when in its expanded position to fit tightly in the milk bottle substantially at the level of the cream line. The separator head is expanded by turning the shaft 1 while the sleeve 21 is held against turning and the expanded separator head then is clamped firmly to the longitudinally curved or tapering inner wall of the bottle substantially at the cream line by sliding the strip 28 downwardly on the sleeve 21 against the rim edge or mouth of the bottle, at which time the spring latch members 32 will engage with the teeth 35 of the sleeve 21 to prevent accidental downward movement of the sleeve 21 in the bottle. Cream then may be poured from the space within the bottle above the separator head while the remainder of the liquid contents of the bottle will be prevented from spilling from the bottle. The spring members 32 then are disengaged from the toothed portions of the sleeve 21 so that the separator head can be lowered slightly within the bottle and then can be conveniently contracted from the position shown in Fig. 2 to the position shown in Figure 5, after which the separator head can be withdrawn readily from the bottle.

Obviously, the invention is susceptible of embodiment in forms other than that illustrated in the accompanying drawings and I therefore consider as my own all such modifications and adaptations thereof as fairly fall within the scope of the appended claims.

I claim:—

1. A cream separator of the character describe comprising a shaft having a non-circular lower end portion, a plurality of cooperative substantially sector-shaped flat vanes disposed in vertical series on the lower end portion of said shaft, said vanes having aligned openings in their inner end portions through which the lower end portion of said shaft extends, the bottom vane having said opening in its end formed to fit snugly on the non-circular end portion of the shaft and the remaining vanes being loose on said shaft, a coupling member secured to the lower face of said bottom vane and having an end portion formed with a non-circular opening for the reception of a portion of the non-circular portion of the shaft, a sleeve rotatably mounted on said shaft above said vanes, said sleeve having teeth arranged in vertical series on opposite portions thereof, the top coupling member secured on the top vane and having opposite notches in the wall of an opening in its end portion and said sleeve having depending extensions at its lower end fitting in notches, each of said vanes above the bottom vane having an arcuate slot formed therein extending along the arc of a circle concentric with said shaft and each of said vanes below the top vane having upstanding stud projections extending into the arcuate slot of the vane next thereabove, whereby relative rotary movements of said sleeve and said shaft will transmit turning motion sequentially to said vanes so that said vanes may be swung from positions to occupy a space practically coincident with a segment of a circle to positions to partially occupy a space practically coincident with the complete circle, and vice versa, the top vane having a depending lip at one longitudinal edge, said lip having a stepped bottom edge for engaging with portions of the top surfaces of certain of said vanes when said vanes are in expanded positions and a pair of spring latch arms adapted to cooperate with the sleeve teeth and hold the entire device upright in a milk bottle.

2. A cream separator of the character described comprising a shaft having a non-circular lower end portion, a plurality of cooperative substantially sector-shaped flat vanes disposed in vertical series on the lower end portion of said shaft, said vanes having alinged openings in their inner end portions through which the lower end portion of said shaft extends, the bottom vane having said opening in its end formed to fit snugly on the non-circular end portion of the shaft and the remaining vanes being loose on said shaft, a coupling member secured to the lower face of said bottom vane and having an end portion formed with a non-circular opening for the reception of a portion of the non-circular portion of the shaft, a sleeve rotatably mounted on said shaft above said vanes, a top coupling member secured on the top vane and having opposite notches in the wall of an opening in its inner end portion and said sleeve having depending extensions at its lower end fitting in notches, each of said vanes above the bottom vane having an arcuate slot formed therein extending along the arc of a circle concentric with said shaft and each of said vanes below the top vane having upstanding stud projections extending into the arcuate slot of the vane next thereabove, and a nut in threaded engagement with said shaft at the upper end of said sleeve.

3. A cream separator of the character described comprising a shaft having a non-circular lower end portion, a plurality of cooperative substantially sector-shaped flat vanes disposed in vertical series on the lower end portion of said shaft, said vanes having aligned openings in their inner end portions through which the lower end portion of said shaft extends, the bottom vane having said opening in its ends formed to fit snugly on the non-circular end portion of the shaft and the remaining vanes being loose on said shaft, a coupling member secured to the lower face of said shaft, a coupling member secured to the lower face of said bottom vane and having an end portion formed with a non-circular opening for the reception of a portion of the non-circular portion of the shaft, a sleeve rotatably mounted on said shaft above said vanes, a top coupling member secured on the top vane and having opposite notches in the wall of an opening in its inner end portion and said sleeve having depending extensions at its lower end fitting in notches, each of said vanes above the bottom vane having an arcuate slot formed therein extending along the arc of a circle concentric with said shaft and each of said vanes below the top vane having upstanding stud projections extending into the arcuate slot of the vane next thereabove, a nut in threaded engagement with said shaft at the upper end of said sleeve, and a strip having a transverse opening intermediate its ends adapted to receive said sleeve and having the end portions adapted to closely contact with the curved opposite edge portions of the mouth of a milk bottle, said sleeve having teeth aranged in vertical series on opposite side portions thereof, each of said teeth having a sloping upper wall and a substantially horizontal lower wall, and a pair of spring latch arms having their outer ends secured on said strip and having their inner ends in sliding contact with the toothed side portions of said sleeve.

WALTER A. GUYER.